United States Patent
Bilanenko et al.

(10) Patent No.: US 9,633,643 B1
(45) Date of Patent: Apr. 25, 2017

(54) BELL FOR A BICYCLE

(71) Applicant: Knog Pty Ltd, Richmond (AU)

(72) Inventors: Chris Bilanenko, Richmond (AU); Hugo Davidson, Richmond (AU)

(73) Assignee: KNOG PTY LTD, Richmond (AU)

( * ) Notice: Subject to any disclaimer, the term of this patent is extended or adjusted under 35 U.S.C. 154(b) by 0 days.

(21) Appl. No.: 15/384,155

(22) Filed: Dec. 19, 2016

(30) Foreign Application Priority Data

Feb. 1, 2016 (AU) .................. 2016900305

(51) Int. Cl.
| | |
|---|---|
| *G10K 1/06* | (2006.01) |
| *G10K 1/07* | (2006.01) |
| *B62J 3/00* | (2006.01) |
| *G10K 1/26* | (2006.01) |
| *G10K 1/072* | (2006.01) |
| *G10K 1/071* | (2006.01) |
| *B62J 11/00* | (2006.01) |

(52) U.S. Cl.
CPC .............. *G10K 1/26* (2013.01); *G10K 1/071* (2013.01); *G10K 1/072* (2013.01); *B62J 3/00* (2013.01); *B62J 11/00* (2013.01)

(58) Field of Classification Search
CPC G10K 1/06; G10K 1/07; G10K 1/072; G10K 1/10; B62J 3/00; B62J 11/00
USPC .................................................. 116/148–172
See application file for complete search history.

(56) References Cited

U.S. PATENT DOCUMENTS

| | | | | |
|---|---|---|---|---|
| 2,554,046 A | * | 5/1951 | Moard ................... | G10K 1/074 116/154 |
| 7,708,458 B2 | * | 5/2010 | Karapatis ............... | G04B 21/08 116/152 |
| 9,499,230 B1 | * | 11/2016 | Russ et al. ............. | B62K 11/14 |
| 2016/0111074 A1 | * | 4/2016 | Lacy ........................ | G10K 1/10 116/149 |
| 2016/0163301 A1 | * | 6/2016 | Pan ......................... | G10K 1/072 116/167 |

FOREIGN PATENT DOCUMENTS

| | | | | | |
|---|---|---|---|---|---|
| CN | 2880634 Y | * | 3/2007 | ............... | B62J 3/00 |
| CN | 101186224 A | * | 5/2008 | ............... | B62J 3/00 |
| CN | 202896746 U | * | 4/2013 | ............... | B62J 3/00 |
| DE | 804760 C | * | 10/1951 | ............... | B62J 3/00 |

* cited by examiner

*Primary Examiner* — R. A. Smith
(74) *Attorney, Agent, or Firm* — Christensen O'Connor Johnson Kindness PLLC (57) ABSTRACT

A bell for a bicycle comprises a mounting bracket for securing the bell to a bicycle handle bar, a striker moveably attached to the mounting bracket, and an arcuate shaped ringer supported outwardly and spaced from the mounting bracket by suspension means that allow the ringer to reverberate when struck by the striker.

15 Claims, 6 Drawing Sheets

BELL FOR A BICYCLE

FIELD OF THE INVENTION

The present invention relates to a bell, and more particularly although not exclusively, to a bell that is securable to a bicycle handle bar.

BACKGROUND OF THE INVENTION

In many jurisdictions, bells are a required piece of equipment for a bicycle. A bicycle bell is typically mounted to a handle bar of the bicycle and is hand actuated. A well-known bicycle bell includes a generally circular mounting bracket that is securable about the handle bar. A generally hemispherical metal bell housing is connected to the mounting bracket. The bicycle bell has a thumb-operated lever that is geared to rapidly rotate a plurality of loosely slung metal discs inside the metal bell housing. The metal discs strike the inside surface of the metal bell housing to produce a sound. Another known, and somewhat simpler, bicycle bell includes a similar mounting bracket and hemispherical metal bell housing. An externally located spring-mounted striker or clapper is used rather than internal metal discs. Bicycle bells of this sort are described in U.S. Pat. No. 5,307,756 and UK patent application no. 2445376.

Prior bicycle bell designs suffer from certain deficiencies. For example, due to the fact that the bell housing sits proudly of the handle bar, the bicycle bell may be aerodynamically inefficient and aesthetically unpleasing. For many user's, space on the handle bar is at a premium, due to the introduction of handle bar mounted computers and tracking devices. Furthermore, cable management, such as for gear and/or brake lines, may be troublesome, as they are routed around the protruding bell housing. Additionally, due to the protruding nature of the bell housing, the bicycle bell may interfere with the correct and safe operation of the bicycle, for example, by catching on the clothing of the bicyclist.

An object of the present invention is to overcome, or at least ameliorate, one or more of the disadvantages of prior bicycle bells, or to at least provide a useful alternative.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

Accordingly, the present invention provides a bell for a bicycle, including:

a mounting bracket for securing the bell to a bicycle handle bar;

a striker moveably attached to the mounting bracket; and an arcuate shaped ringer supported outwardly and spaced from the mounting bracket by suspension means that allow the ringer to reverberate when struck by the striker.

The ringer may be formed from a length of material bent into an arcuate shape to make a section of a circle. Alternatively, the ringer may be formed from any suitable manufacturing method, such as casting the material into the arcuate shape, machining or CNC cutting.

The arcuate shape of the ringer is such that it may extend about a portion of the circumference of the handle bar. Typically the ringer may extend about an arc that is greater than 180 degrees, but is preferably 220 degrees, and therefore a major arc. However, it will be appreciated that the arc may be a minor arc and may be between 90 degrees and 180 degrees. The outside radius of curvature of the ringer may be in the range of approximately 15 to 35 mm, more preferably 18 to 24.5 mm. The thickness of the ringer may be in the range of 0.5 to 20 mm, but is preferably between 3 to 6 mm.

The outer surface of the ringer may be substantially flat or may be convex.

The ringer is preferably made from a metal or metal alloy. For example, the ringer may be steel, stainless steel, aluminium, brass, copper or titanium. The surface finish of the material of the ringer may be natural, painted, anodised, debossed and/or engraved, plated with material such as gold, silver or copper, or any other suitable finish.

The ringer can be supported by one or more suspension means. Two or more suspension means may be spaced apart along the length of the ringer. In one embodiment, the suspension means may include one or more pins projecting outwardly from the surface of the mounting bracket. A spring is provided about the pin and connected at an outer end to the ringer. The spring holds the ringer a distance away from the mounting bracket. The spring and pin can project in a direction that is normal to the curve of the ringer and mounting bracket surface.

The suspension means are preferably flexible or resilient, such that they allow the ringer to reverberate when struck by the striker. Suitable suspension means may be compression or leaf springs, or foam, silicone, felt, mesh or cloth pads.

The mounting bracket is such that it can be removably mounted to a bicycle handle bar or other similar structure. In one embodiment, the mounting bracket is a generally circular loop having two ends that can be fastened together. Any suitable fastening device may be used, such as a nut and bolt, a latch or a hose clamp fixing. The mounting bracket loop may be flexible or semi-rigid. The loop could be made from plastic, for example Nylon®, a composite such as carbon fibre, leather, steel, aluminium, brass, copper or combinations of materials such as metal over-moulded with plastic or silicon.

The mounting bracket may be shaped such that, when positioned on a handle bar, a void is created adjacent one section of the handle bar. This accommodates bicycle cables, such as gear and/or brake cables, to be positioned underneath the mounting bracket.

One or more locating pins may be provided that extend outwardly from the mounting bracket outer surface into a depression or recess created in the underside surface of the ringer. In normal use, the locating pin does not contact the inside surface of the recess. However, if the ringer is moved sideways about the suspension means, the locating pin will prevent further movement.

The striker may be of any suitable shape. In one embodiment, the striker is a hammer striker that is pivotally connected to the mounting bracket. Biasing means in the form of a spring may be provided to return the striker to a resting position such that it is spaced off the ringer surface. The striker is able to be pulled outwardly against the bias and when released will pivot past the resting position, coming into contact with the ringer. This results in reverberation of the ringer, creating a bell sound.

In an alternative embodiment, the striker may be a sliding striker, such that it is positioned adjacent an end of the ringer. The striker is able to move about the circumference of the mounting bracket, by being pulled away from the end of the ringer against a biasing means, when released striking the end surface of the arcuate ringer.

The strikers may be made from any suitable material for the particular arcuate ringer material used. Examples of suitable striker material may be plastic, such as Nylon®, a composite such as carbon fibre, wood, alloys, steels, brass, copper, or plastics with metal inserts.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1A:
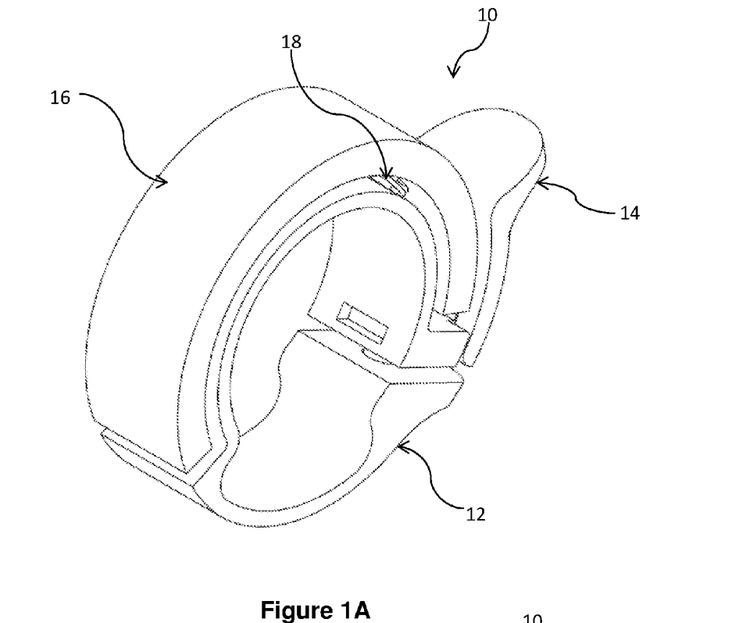
FIG. 1A is a perspective view of a bell for a bicycle according to an embodiment of the invention.
Figure 1B:
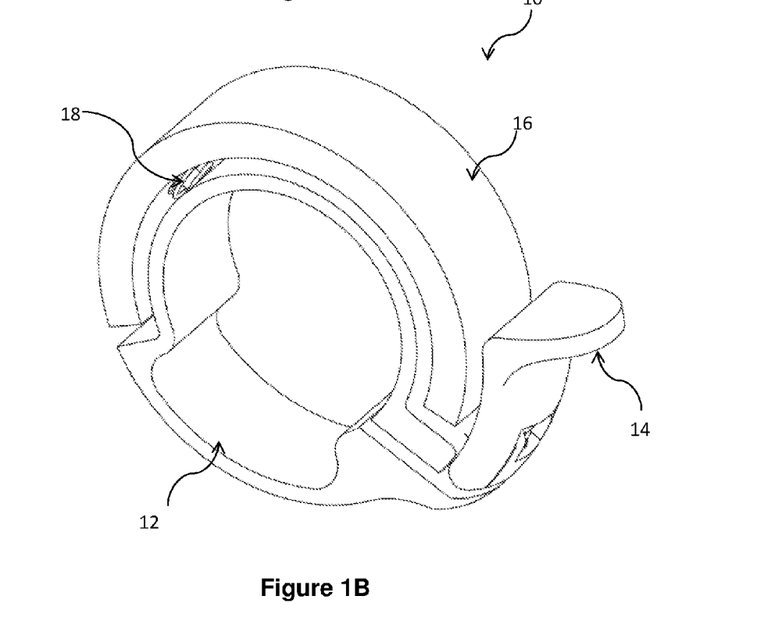
FIG. 1B is another perspective view of the bell of FIG. 1A.

Referring to FIGS. 1A and 1B, there is shown a bell 10 for a bicycle that includes a generally circular mounting bracket 12, a striker 14, and an arcuate shaped ringer 16. The striker 14 is moveably attached to the mounting bracket 12, such that it can be retracted by a user and released to strike the ringer 16. The ringer 16 is supported outwardly and spaced from the mounting bracket 12 by suspension means 18 that allow the ringer 16 to reverberate when struck by the striker 14. Advantageously, the mounting bracket 12 is dimensioned so as to be removably mounted about a handle bar 100 of a bicycle (see FIGS. 3 and 5) in the manner described below. As shown throughout the figures, the bell 10 has a relatively lower profile as compared to prior bicycle bells, thereby resulting in a pleasing aesthetic design that is relatively aerodynamically efficient.

Figure 2:
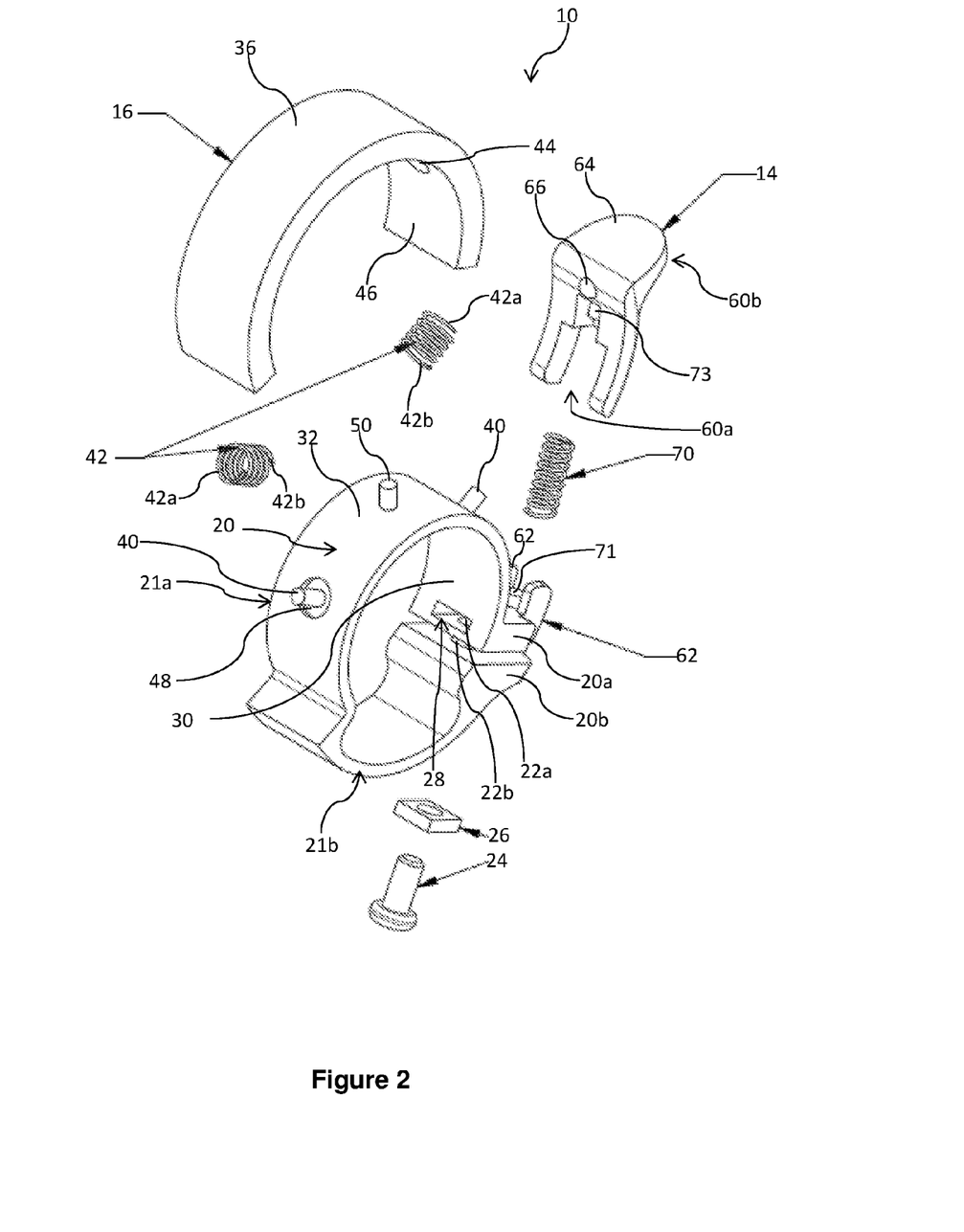
FIG. 2 is an exploded perspective view of various components of the bell of FIG. 1.

As shown in greater detail in FIG. 2, the mounting bracket 12 comprises a generally circular loop 20 having adjacent opposed ends 20a and 20b. The mounting bracket 12 is semi-rigid or flexible so as to allow the ends 20a, 20b to be flexed over a cylindrical handle bar 100 when mounting or unmounting the bell 10.

In the illustrated embodiment, the mounting bracket 12 comprises a resiliently flexible plastic, but could alternatively comprise carbon fibre, leather, steel, aluminium, brass, copper, or any other suitable material.

The ends 20a, 20b of the circular loop 20 are adapted to be fastened together by any suitable means known to those skilled in the art. In the illustrated embodiment, the ends 20a, 20b are outwardly extending generally rectangular flanges that include aligned through-holes 22a, 22b respectively. The through-holes 22a, 22b are configured to threadingly receive a bolt 24, which is secured by a square nut 26. Square nut 26 is slidingly received through a complementary slot 28 having an opening on an inside surface 30 of the circular loop 20. Slot 28, located adjacent the mounting bracket end 20a, merges with through-hole 22a, thereby ensuring that ends 20a, 20b are releasably fastened when bolt 24 is threaded therethrough.

Figure 3:
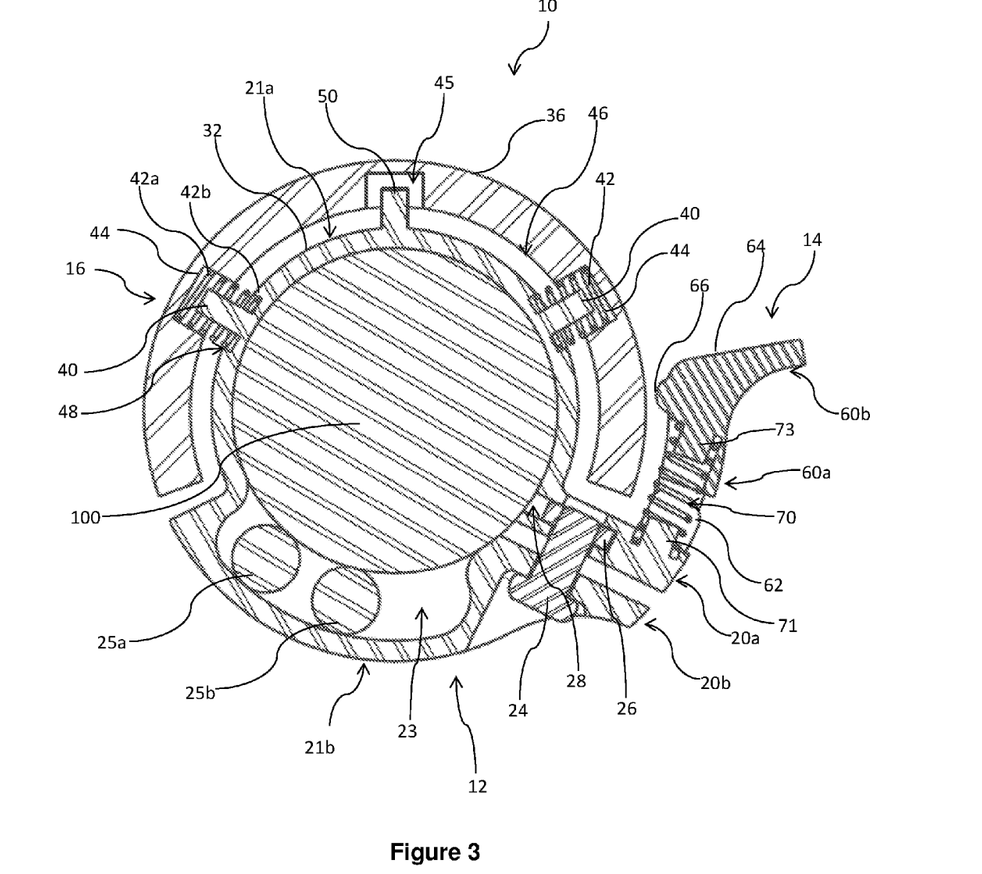
FIG. 3 is a side cross-sectional view of the bell of FIGS. 1 and 2 mounted upon a bicycle handle bar and showing brake and gear cables.

The generally circular loop 20 of the mounting bracket 12 has a first arcuate portion 21a spanning an arc of approximately 220 degrees and being dimensioned so as to fit snugly about a cylindrical bicycle handle bar 100 (FIG. 3). In one embodiment, the first arcuate portion 21a has an inside diameter of approximately 31.8 mm to accommodate a standard size bicycle handle bar. In another embodiment, the first arcuate portion has an inside diameter of approximately 22.2 mm to accommodate a smaller size bicycle handle bar. It will be appreciated that the size could be varied to accommodate different sized bars for different applications. The generally circular loop 20 also has a second outwardly projecting arcuate portion 21b spanning an arc of approximately 140 degrees. The arcuate portion 21b is dimensioned so as to define a generally dovetail shaped void 23 that is appropriately sized to receive one or more bicycle cables, such as gear and/or brake cables 25a, 25b. Advantageously therefore, the bell 10 may act to assist with cable management by routing and clamping cables along a handle bar and underneath the mounting bracket 12.

The arcuate shaped ringer 16 is dimensioned such that it extends over a portion of the length of the circular loop 20. In the illustrated embodiment, the ringer 16 extends about an arc that is approximately 220 degrees and has an outside radius of curvature of approximately 24.5 mm i.e. the ringer 16 generally extends over the first arcuate portion 21a. In alternative non-illustrated embodiments, the arcuate ringer 16 may extend about an arc that is less than or greater than 220 degrees, and may have an outside radius of curvature between approximately 15 and 35 mm. In the illustrated embodiment, the arcuate ringer 16 has a thickness of approximately 4.5 mm and an arcuate length of approximately 95 mm. In alternative non-illustrated embodiments, the arcuate ringer may have a thickness between approximately 0.5 and 20 mm and an arcuate length between approximately 30 and 220 mm. The arcuate ringer 16 is generally made from a metal or a metal alloy and is formed into its arcuate shape by any suitable means known to those skilled in the art, for example, by bending, casting or machining. The ringer may be steel, stainless steel, aluminium, brass, copper or titanium. The surface finish of the material of the ringers may be natural, painted, anodised, debossed and/or engraved, plated with material such as gold, silver or copper, or any other suitable finish. The arcuate ringer 16 illustrated has a substantially flat anodised outer surface 36 to prevent corrosion.

The arcuate ringer 16 is supported about the mounting bracket 12 by suspension means 18 that includes a pair of pins 40 that are integral to, and outwardly project from, an outer surface 32 of the circular loop 20. The pins 40 span an arc of approximately 120 degrees. The pins 40 project in a direction that is substantially normal to the curve of the circular loop 20 and have a height between approximately 3.3 and 3.5 mm and a diameter between approximately 2.2 and 2.5 mm. Referring particularly to FIG. 3, a cylindrical compression spring 42 is provided about each pin 40. Spring 42 is connected at a first outer end 42a to an inside of a generally cylindrical recess 44 located in an underside surface 46 of the arcuate ringer 16. A second inner end 42b of spring 42 is connected to an inside of a similar generally cylindrical depression or recess 48 located in the outer surface 32 of the circular loop 20 (see FIG. 2). The dimensions of the cylindrical recesses 44, 48 approximate an outer circumference of the spring 42 such that spring ends 42a, 42b fit snugly within the recesses 44, 48. In the illustrated embodiment, the diameter of the cylindrical recesses 44, 48 and spring 42 are approximately 6 mm. Each of the cylindrical compression springs 42 act to hold the arcuate ringer 16 a distance away from the mounting bracket 12. For example, a distance of between 2 and 2.5 mm is created between the outer surface 32 of the circular loop 20 and the underside or inner surface 46 of the arcuate ringer 16. The compression springs 42 are resiliently flexible such that they allow the arcuate ringer 16 to reverberate when struck by the striker 14, as is described below.

It will be appreciated that whilst the embodiment illustrated utilised springs as the suspension means, any suitable suspension means may be used. For example, foam, silicone, felt, mesh or cloth pads, or other means having a degree of flexibility or resilience to provide movement to allow the ringer to reverberate when struck by the striker.

Figure 4:
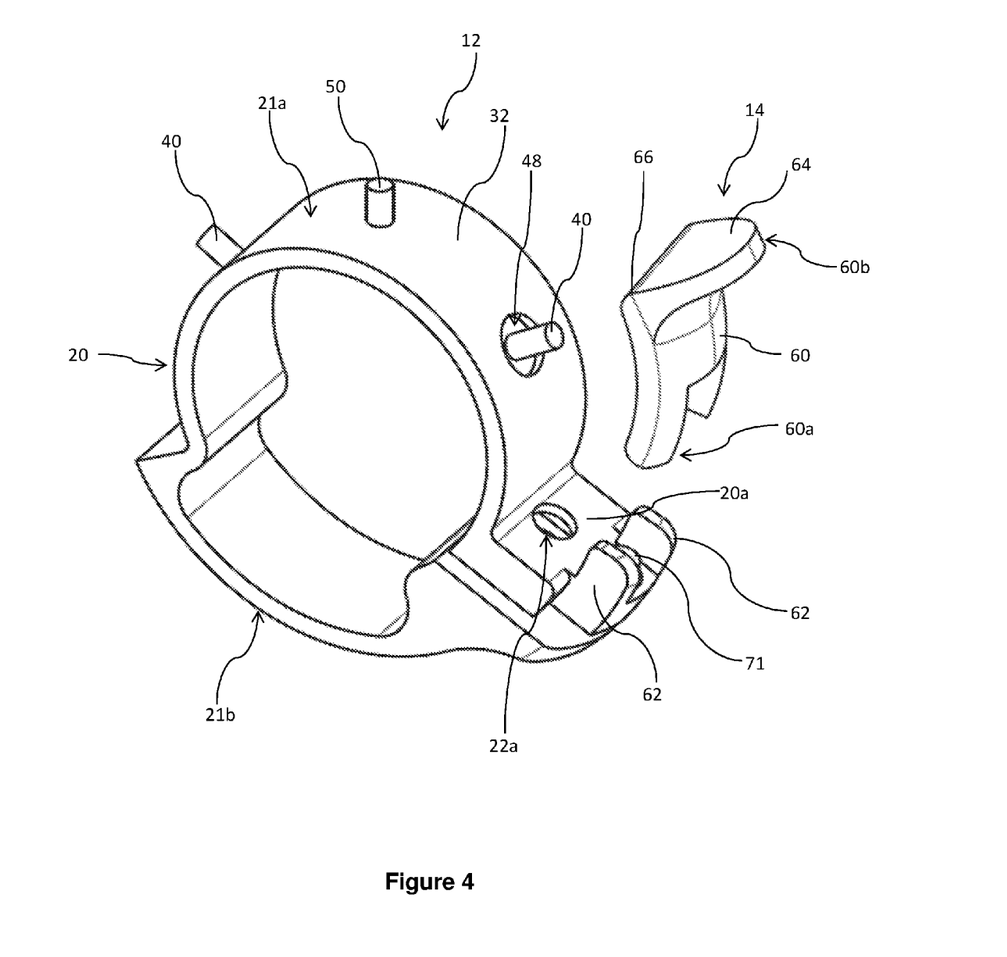
FIG. 4 is a perspective view of a mounting bracket and striker according to an embodiment of the invention.

Referring particularly to FIGS. 3 and 4, the circular loop 20 of the mounting bracket 12 further includes a third pin 50 that is integral to, and outwardly projects from, the outer surface 32 of the circular loop 20. Pin 50 is located along the circular loop 20 equidistantly between the pins 40 and is received in a further generally cylindrical recess 45 located in the underside surface 46 of ringer 16. Pin 50 is disposed near the middle of the arcuate length and width of the ringer 16. In the illustrated embodiment, pin 50 has a height between approximately 3.3 and 3.9 mm and a diameter between approximately 2.2 and 2.5 mm. The adjacent cylindrical recess 45 has a diameter of approximately 5.5 mm and a depth of approximately 2.8 to 3.5 mm. In normal use, the pin 50 does not contact the inside surface of the recess 45. However, if the arcuate ringer 16 is moved laterally about the springs 42, for example by a sideways force, the pin 50 will prevent further movement of the arcuate ringer 16 due to it abutting an inside surface of the recess 45, thereby assisting to prevent detachment of the arcuate ringer 16 from the mounting bracket 12.

As described above, the striker 14 is moveably attached to the mounting bracket 12. The striker 14 is adapted to cause the arcuate ringer 16 to reverebrate when struck, so as to create a "bell-like" sound. In the embodiment illustrated in FIG. 4, the striker 14 includes an elongate body 60 that has a first forked end 60a that is receiveable about a pair of laterally projecting forked arms 62 located on the flanged end 20a of the mounting bracket 12. A second end 60b is adapted to be actuated and to strike the arcuate ringer 16. The elongate body 60 has an overall length of between approximately 20 and 24 mm and is slighty curved so as to approximate the curvature of an adjacent section of the arcuate ringer 16. The free end 60b of the striker 14 includes an outwardly projecting finger-pad portion 64 that is dimensioned and adapted to receive a finger, typically a thumb, to actuate the striker 14. The free end 60b also includes a hemispherical striking portion 66 that projects towards the arcuate ringer 16 when the striker is moveably attached to the mounting bracket 12. The hemispherical striking portion 66 strikes the arcuate ringer 16 when the striker 14 is actuated.

The striker 14 is movably attached to the mounting bracket 12 via a biasing means in the form of a compression spring 70 (see FIG. 3). The compression spring 70 illustrated has a length of approximately 12.7 mm and an outside diamater of approximately 4.6 mm. Spring 70 is received at one end about a cylindrical boss 71 defined in a space between the laterally projecting arms 62 of the flanged end 20a of the mounting bracket 12. At an opposite end, spring 70 is received about a further cylindrical boss 73 defined in a space between the forked end 60a of the striker 14. The striker 14 is biased to a resting position (illustrated in FIG. 3) by the compression spring 70. In this resting position, the hemispherical striking portion 66 of the striker 14 is spaced from the outer surface 36 of the arcuate ringer 16 at a distance of approximately 1 mm. When desired, the striker 14 is able to be pulled outwardly against the bias provided by spring 70 by a finger force on the finger-pad portion 64. When the finger force is released, the striker 14 will pivot past the resting position and the striking portion 66 will come into contact with the outer surface 36 of the arcuate ringer 16, thereby reverberating the ringer 16 and producing the bell-like sound.

In the embodiment illustrated in FIGS. 1 to 5, the striker 14 is hammer-like in operation in that it pivots about the cylindrical boss 71 to strike the arcuate ringer 16. In an alternative arrangement illustrated in FIGS. 6A and 6B, the bell 110 comprises a striker 114 that is slidable along an arcuate rail 80 defined along an outer section of the generally circular loop 120. The sliding striker 114 includes an outwardly projecting pin-like finger-pad portion 164 at one end that is adapted to receive a finger to actuate the sliding striker. When desired, the sliding striker 114 is pulled along the rail 80 in a direction away from an end 116a of the arcuate ringer 116 against the bias of an internal spring 170. When released the striker 114 slides past its resting position and strikes the arcuate ringer end 116a to create a "bell-like" sound.

The strikers 14, 114 may be made from any suitable material for the particular ringer material used. Examples of suitable striker material may be plastic, such as Nylon®, composite such as carbon fibre, wood, alloys, steels, brass, copper, or plastics with metal inserts.

The shape, weight and material of the striker affect the sound created by the ringer. An example hammer-type striker 14 can be made from Nylon® and have a length of 20.8 mm, a width of 15 mm and a weight of approximately 1.5 grams. A suitable compression spring to produce a "bell-like" sound could have a length of 12.7 mm, a diameter of 3 mm and a wire diameter of 0.56 mm. The rate of stiffness of the spring could be 4.73 N/mm.

Figure 5:
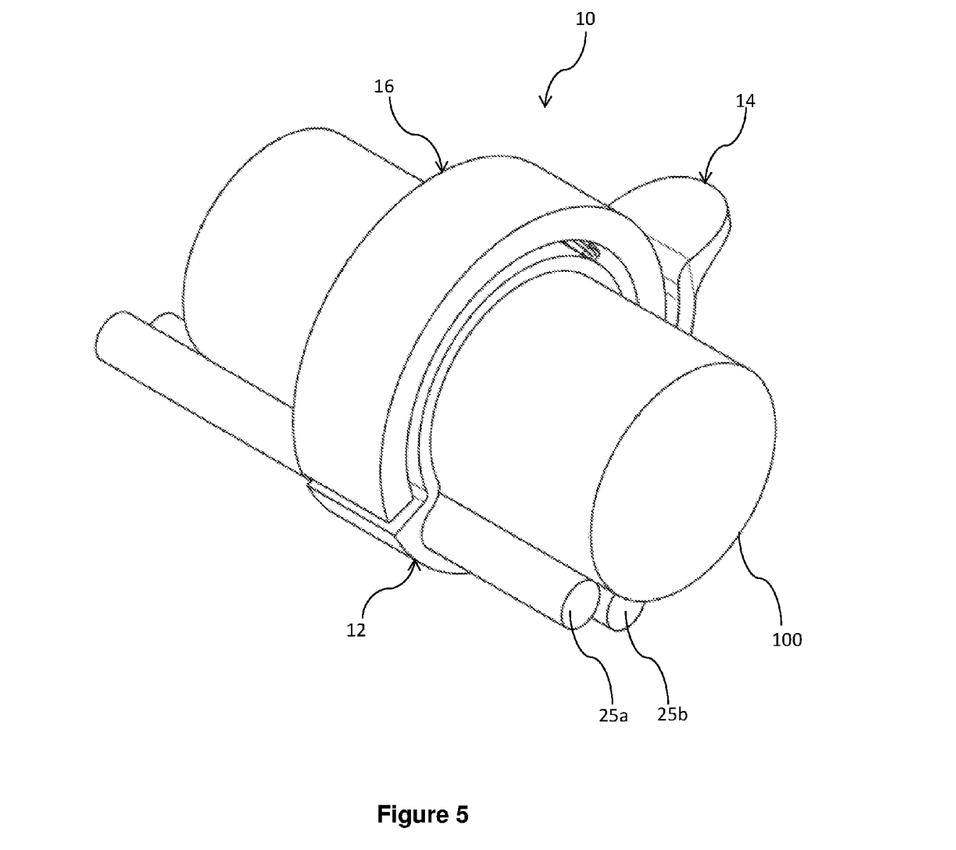
FIG. 5 is a perspective view of the bell of FIGS. 1 to 3 mounted upon a cut-off bicycle handle bar and showing brake and gear cables.
Figure 6A:
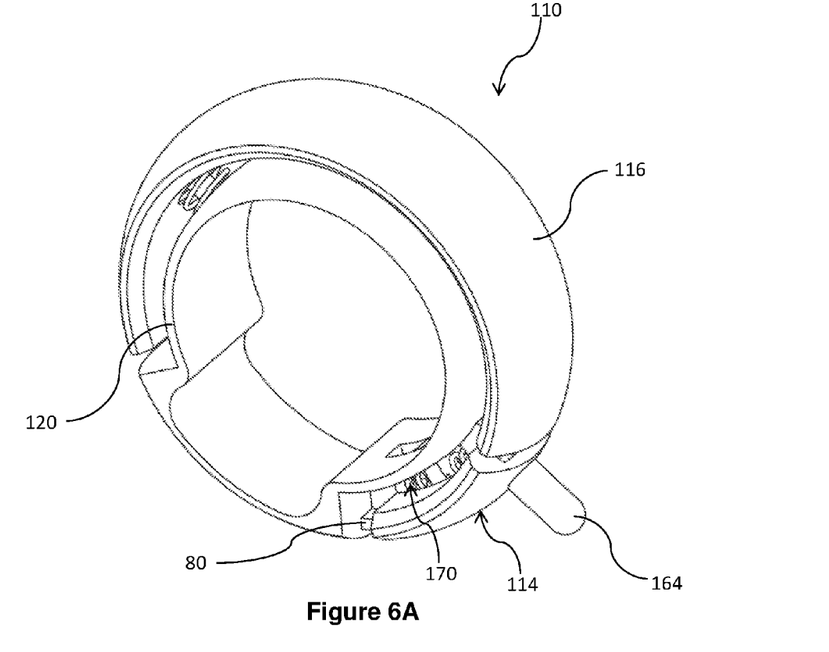
FIG. 6A is a perspective view of a bell for a bicycle according to another embodiment of the invention.
Figure 6B:
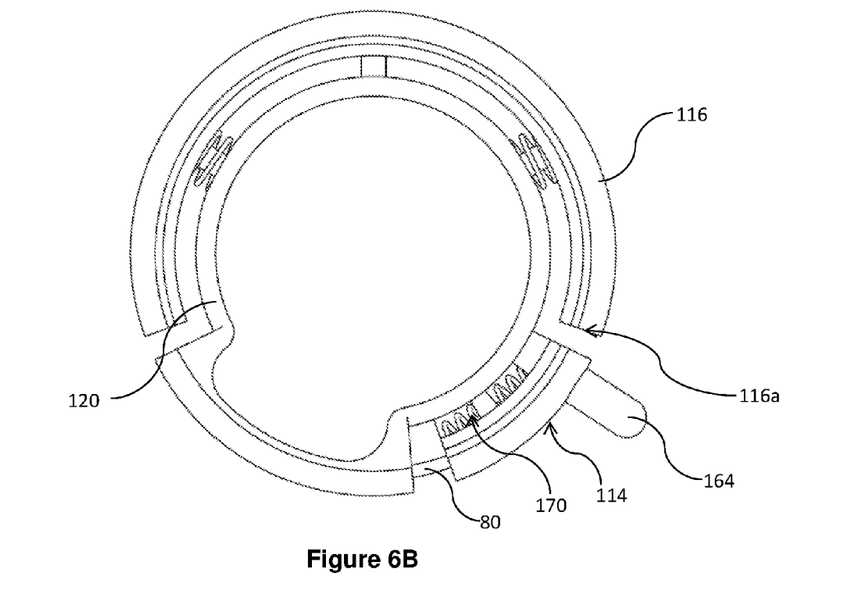
FIG. 6B is a side view of the bell of FIG. 6A.

As shown in FIG. 5, the present invention provides a bell for a bicycle that, when mounted to a handle bar is visually sleek and elegant and provides minimum projection from the surface of the handle bar. The mounting bracket is adapted to provide integrated cable management.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A bell for a bicycle, comprising:
   a mounting bracket for securing the bell to a bicycle handle bar;
   a striker moveably attached to the mounting bracket; and
   an arcuate shaped ringer supported outwardly and spaced from the mounting bracket by suspension means that allow the ringer to reverberate when struck by the striker.

2. The bell of claim 1, wherein the arcuate ringer extends about an arc that is greater than 180°.

3. The bell of claim 1, wherein the arcuate ringer extends about an arc that is generally 220°.

4. The bell of claim 1, wherein the arcuate ringer comprises one or more of the following: steel, stainless steel, aluminum, brass, copper, or titanium.

5. The bell of claim 1, wherein the suspension means is flexible or resilient, such that it allows the arcuate ringer to reverberate when struck by the striker.

6. The bell of claim 5, wherein the suspension means comprises one or more springs, each of the one or more springs located about a corresponding one of one or more pins extending outwardly from an outer surface of the mounting bracket, the spring(s) connected at an outer end to the arcuate ringer, the spring(s) being resiliently flexible to allow the arcuate ringer to reverberate when struck by the striker.

7. The bell of claim 6, wherein the spring(s) are dimensioned such that the arcuate ringer is spaced from the mounting bracket at a distance of between approximately 2 and 2.5 mm.

8. The bell of claim 1, wherein the suspension means comprises two or more springs, each of the two or more springs located about a corresponding one of two or more pins that are spaced apart along the length of the mounting bracket and project in a direction that is normal to the curve of the mounting bracket.

9. The bell of claim 1, further including at least one locating pin extending outwardly from the outer surface of the mounting bracket and received inside a recess of the arcuate ringer, the locating pin being configured to abut an inside surface of the recess if the arcuate ringer is moved laterally about the suspension means to thereby assist in preventing further lateral movement and detachment of the arcuate ringer from the mounting bracket.

10. The bell of claim 1, wherein the striker includes a striking portion adapted to cause the arcuate ringer to reverberate when struck, and a finger-pad portion adapted to receive a finger to actuate the striker.

11. The bell of claim 10, wherein the striker is pivotally connected to the mounting bracket and configured to be pulled in a direction away from the arcuate ringer against a resting position bias such that, when released, the striker is caused to pivot past the resting position due to the bias and strike the arcuate ringer to reverberate the arcuate ringer and create a bell-like sound.

12. The bell of claim 10, wherein the striker is slidable along an arcuate rail of the mounting bracket and configured to be pulled in a direction away from the arcuate ringer against a resting position bias such that, when released, the striker is caused to slide past the resting position due to the bias and strike the arcuate ringer to reverberate the arcuate ringer and create a bell-like sound.

13. The bell of claim 1, wherein the striker comprises one or more of the following: plastic, carbon fibre, wood, an alloy, steel, brass, copper, or a plastic with a metal insert.

14. The bell of claim 1, wherein the mounting bracket comprises a generally circular loop having ends that are releasably fastenable such that the mounting bracket is removably mountable to the handle bar, wherein the generally circular loop comprises a first arcuate portion dimensioned to fit snugly about a portion of the handle bar, and a second arcuate portion that defines a cavity between the circular loop and the handle bar, the cavity being dimensioned to receive one or more bicycle operating cables, such as gear and/or brake cables.

15. The bell of claim 14, wherein the first arcuate portion extends about an arc of between approximately 180° and 220° and the second arcuate portion correspondingly extends about an arc of between approximately 180° and 140°, and wherein the arcuate ringer extends over the first arcuate portion of the generally circular loop.

* * * * *